United States Patent [19]
Dross

[11] Patent Number: 6,104,531
[45] Date of Patent: Aug. 15, 2000

[54] TELESCOPIC SIGHT WITH VARIABLE MAGNIFICATION

[75] Inventor: Heinrich Dross, Ehringshausen-Daubhausen, Germany

[73] Assignee: Hensoldt AG, Germany

[21] Appl. No.: 08/860,474

[22] PCT Filed: Oct. 25, 1996

[86] PCT No.: PCT/DE96/02033

§ 371 Date: Jun. 26, 1997

§ 102(e) Date: Jun. 26, 1997

[87] PCT Pub. No.: WO97/15845

PCT Pub. Date: May 1, 1997

[30] Foreign Application Priority Data

Oct. 28, 1995 [DE] Germany .................. 195 40 256

[51] Int. Cl.⁷ .................................. G02B 23/00
[52] U.S. Cl. .............................. 359/422; 359/704
[58] Field of Search ........................ 359/422, 399, 359/425, 426, 701, 704

[56] References Cited

U.S. PATENT DOCUMENTS 3,684,376   8/1972  Lessard ...................... 356/21
5,180,875   1/1993  Berry, Jr. et al. ............ 42/101

*Primary Examiner*—Cassandra Spyrou
*Assistant Examiner*—Mark A. Robinson

[57] ABSTRACT

A telescopic sight with variable magnification includes an adjusting ring for varying the magnification. The telescopic sight housing and an eyepiece stub are arranged together in a single part. The adjusting ring is arranged between the eyepiece and an object in a groove formed between the telescopic sight housing and the eyepiece stub.

8 Claims, 3 Drawing Sheets

TELESCOPIC SIGHT WITH VARIABLE MAGNIFICATION

BACKGROUND OF THE INVENTION

The invention relates to a telescopic sight with variable magnification, more particularly, to a telescopic sight in which the magnification is changed by means of an adjusting ring.

1. Discussion of Prior Art

Such telescopic sights with variable magnification are already known in the state of the art.

A telescopic sight is known from U.S. Pat. No. 4,072,396 in which the adjusting ring is arranged on the objective lens. However, this position of the adjusting ring is impractical in use. The same holds for the telescopic sight which is known from U.S. Pat. No. 3,423,146.

A telescopic sight is known from U.S. Pat. No. 4,255,013 in which the adjusting ring projects beyond the telescopic sight housing on the eyepiece side. Also, in the telescopic sight which is known from U.S. 3,948,587, the adjusting ring projects beyond its whole circumference out of the housing of the telescopic sight.

In the telescopic sights which are known from U.S. Pat. No. 3,782,822 and U.S. Pat. No. 4,172,634, the adjusting ring is arranged on the eyepiece side, but here also projects from the housing of the telescopic sight over its full circumference.

2. Summary of the Invention

The invention has as its object to obtain a higher stability of the housing together with a simplification of manufacture, with the adjustment taking place at a position which is convenient for use, and the design making possible a substantially smooth surface.

This object is attained according to the invention by a telescopic sight with variable magnification, in which the magnification is varied by means of an adjusting ring and the telescopic sight includes a housing and an eyepiece stub that together form a single part, the adjusting ring is arranged between the eyepiece and the object, and a groove in which the adjusting ring is guided is formed between the telescopic sight housing and the eyepiece stub.

When the telescopic sight housing and the eyepiece stub are made together as a single part, according to the invention, not only is there one part less to manufacture for the telescopic sight, but this simplification of manufacture also has the advantage that the connection between the two parts is solid, and a higher stability of the system is thus obtained.

In an advantageous manner, a groove is formed between the telescopic sight housing and the eyepiece stub, the adjusting ring being guided in the groove. This feature aims at a more secure guiding of the adjusting ring in relation to the direction of the optical axis.

In order to obtain a simple mounting procedure, the adjusting ring is arranged in an advantageous manner around the telescopic sight housing.

The mounting of the adjusting ring is effected in a very uncomplicated manner if the adjusting ring is constructed from two half shell segments, which are connected together in the mounted state to form a circular body. Moreover this permits the materials used for the adjusting ring to be no longer restricted to only certain materials.

In particular, the use of light alloy or a hard plastic for the half shells of the adjusting ring is advantageous.

A pin, projecting from a pin seating which is formed in the adjusting ring, is fitted so that the magnification can be varied; the pin can drive the inner moving elements.

To secure the adjusting ring against inadvertent dismantling into its two component parts, an elastic auxiliary member is to be arranged around the adjusting ring.

The elastic auxiliary member is then advantageously made of rubber, which can in addition seal the opening in the telescopic sight housing.

In order to produce a good connection between the adjusting ring and the auxiliary member, recesses and/or raised portions are to be arranged in the adjusting ring, and engage in corresponding raised portions and/or recesses of the elastic auxiliary member.

BRIEF DESCRIPTION OF THE DRAWINGS

The invention will now be described with reference to preferred embodiments, taken together with the drawings, in which.

DETAILED DESCRIPTION OF PREFERRED EMBODIMENTS

Figure 1:
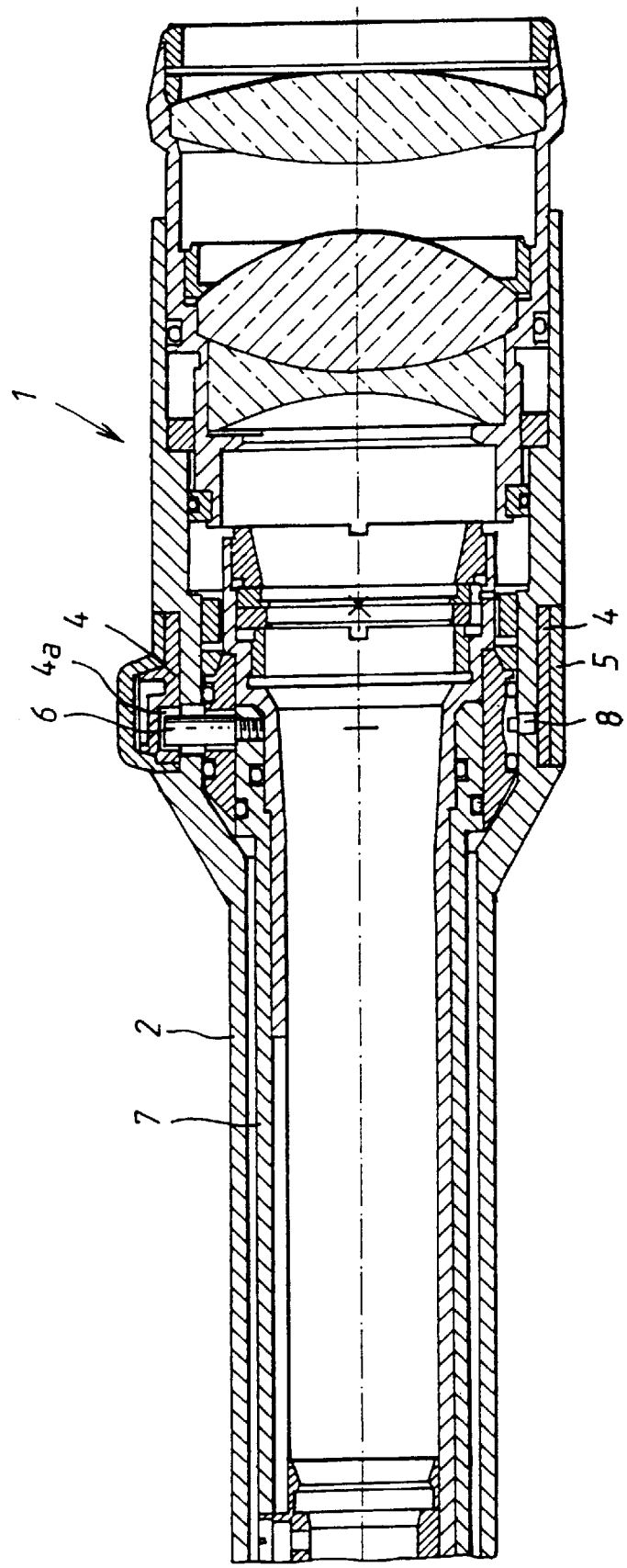
FIG. 1 shows a section through a telescopic sight with the magnification adjustment according to the invention.

FIG. 1 shows a section through the telescopic sight (1) with variable magnification, according to the invention, in the region where the eyepiece stub joins the telescopic sight housing. The telescopic sight housing and the eyepiece stub are made in one piece (2).

A groove (3) is present between the eyepiece stub and the remainder of the telescopic sight housing, and provides a guide for the adjusting ring (4). An elastic auxiliary member (5) of rubber is arranged around the adjusting ring (4); it is slipped over the adjusting ring (4) after this has been mounted.

A pin seating (4a), into which a pin (6) projects, is present in the adjusting ring (4). This pin (6) transmits the radial motion of the adjusting ring (4) to an inner hollow cylinder (7), which causes the required lens movements. A pin (8) is also present on the opposite side of the telescopic sight housing (2), and provides a counteracting force to the adjusting pin (6).

The adjusting ring (4) together with the auxiliary member (5) does not project beyond the upper edge of the groove (3).

Figure 2A:
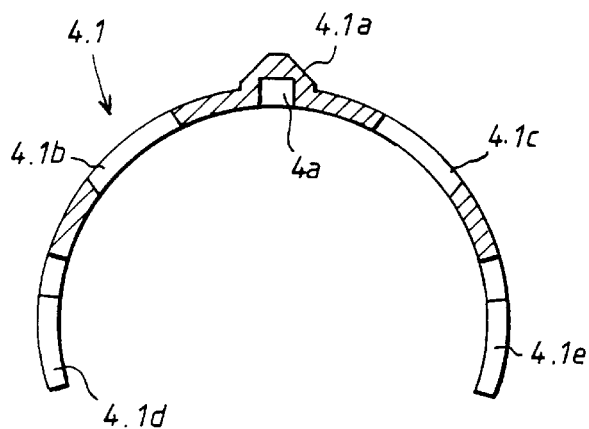
FIG. 2a shows a vertical section through the upper half circle of the adjusting element.
Figure 2B:
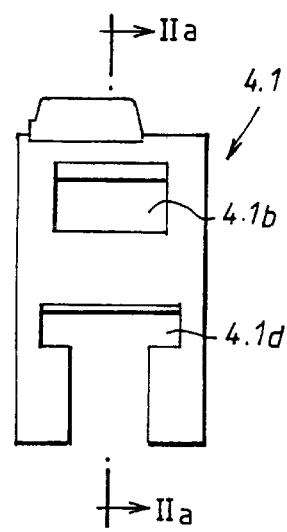
FIG. 2b shows a side view of the upper half circle of the adjusting element.
Figure 3A:
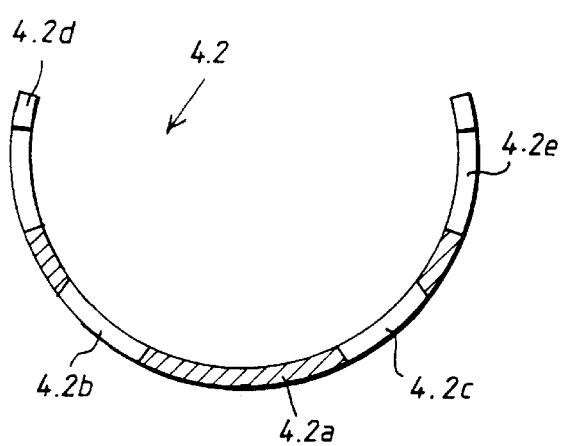
FIG. 3a shows a side view of the lower half circle of the adjusting element.
Figure 3B:
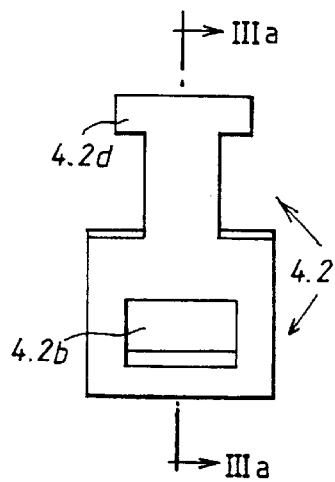
FIG. 3b shows a side view of the lower half circle of the adjusting element.
Figure 4:
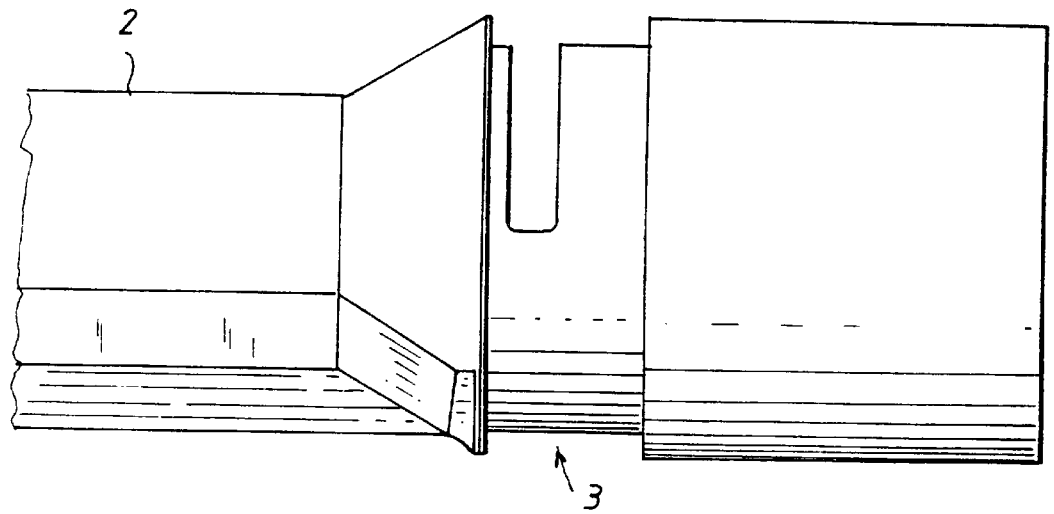
FIG. 4 shows a side view of the outer casing of the telescopic sight in the region of the magnification adjustment according to the invention.

In FIGS. 2a and 2b, and also in FIGS. 3a and 3b, the half shell segments (4.1, 4.2) of the adjusting ring are shown.

The upper half shell (4.1) is a circular annular body and has a semicircular cross section which is greater than 180°. A convexity (4.1a) is present in the upper portion of this half shell (4.1), and has an aperture (4*a*), directed inward, which serves as a pin seating. The half shell (4.1) has respective rectangular apertures (4.1*b*, 4.1*c*) on each side of this convexity (4.1*a*).

Two T-shaped apertures (4.1*d*, 4.1*e*) are formed at the ends of the upper half shell (4.1).

The lower half shell (4.2) is also a semicircular body and also has a semicircular cross section, which is greater than 180°. It has two rectangular apertures (4.2*b*, 4.2*c*) at the sides of its lowest point (4.2*a*).

Two T-shaped extensions (4.2*d*, 4.2*e*) are present at the ends of the lower half shell (4.2), and fit exactly into the T-shaped openings (4.1*d*, 4.1*e*) of the upper half shell (4.1).

If the two half shells (4.1, 4.2) of plastic are fitted together, the two T-shaped extensions (4.2*d*, 4.2*e*) engage in the two T-shaped openings (4.1*d*, 4.1*e*), and the two half shells (4.1, 4.2) form a closed circle without play.

Figure 5B:
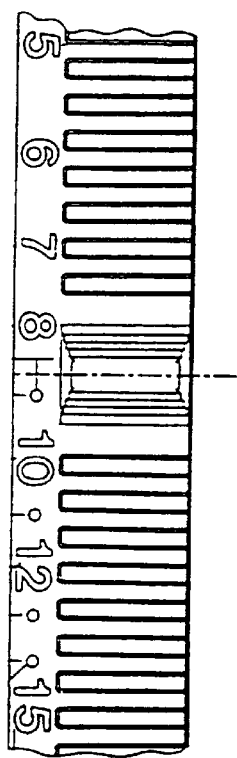
FIG. 5b shows a detail of a view of the outer rubber cover.
Figure 5A:
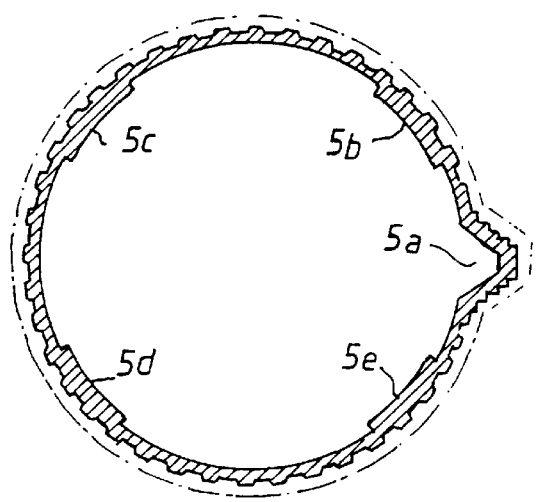
FIG. 5a shows a section through the outer rubber cover.

If the adjusting ring (4), with its two half shells (4.1, 4.2), is mounted in the groove (3) of the telescopic sight housing (2), the elastic auxiliary member, shown in cross section in FIG. 5*a*, is slipped over the adjusting ring (4) so that its recess (5*a*) and its raised portions (5*b*–5*e*) engage exactly on the convexity (4.1*a*) or in the rectangular apertures (4.1*b*, 4.1*c*, 4.2*b*, 4.2*c*) of the adjusting ring (4). For indication of the setting of the adjusting ring (4), corresponding markings are present on the auxiliary member (5), in the form of numerals and dots as shown in FIG. 5*b*.

What is claimed is:

1. A telescopic sight (1) with variable magnification, comprising:

a telescopic sight housing (2) and an eyepiece stub arranged together as a single part, and an adjusting ring (4) arranged between an eyepiece and an object, wherein a groove for guiding said adjusting ring is arranged between said telescopic sight housing (2) and said eyepiece stub and wherein said adjusting ring (4) does not project beyond an upper edge of said groove.

2. The telescopic sight according to claim 1, in which said adjusting ring (4) is arranged around said telescopic sight housing (2).

3. The telescopic sight according to claim 1, wherein said adjusting ring (4) comprises two half shells (4.1, 4.2) connected together to form a circular body, in a mounted state.

4. The telescopic sight according to claim 3, wherein said two half shells (4.1, 4.2) are made of a light alloy or hard plastic.

5. The telescopic sight according to claim 1, further comprising a pin seating (4*a*) formed in said adjusting ring and a pin (6) arranged in said pin seating (4*a*) and projecting inward for driving internal moving elements of said telescopic sight.

6. The telescopic sight according to claim 1, further comprising an elastic auxiliary member (5) arranged around said adjusting ring (4).

7. The telescopic sight according to claim 6, wherein said elastic auxiliary member (5) is made of rubber.

8. The telescopic sight according to claim 6, wherein said adjusting ring (4) includes recesses or raised portions and said elastic auxiliary member (5) includes corresponding raised portions or recesses for engaging in said recesses or raised portions of said adjusting ring (4).

* * * * *